(12) United States Patent
Muto

(10) Patent No.: US 9,203,322 B2
(45) Date of Patent: Dec. 1, 2015

(54) POWER CONVERSION APPARATUS AND POWER CORRECTION METHOD

(71) Applicant: TOYOTA JIDOSHA KABUSHIKI KAISHA, Toyota-shi, Aichi-ken (JP)

(72) Inventor: Jun Muto, Toyota (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 14/534,867

(22) Filed: Nov. 6, 2014

(65) Prior Publication Data
US 2015/0138840 A1   May 21, 2015

(30) Foreign Application Priority Data
Nov. 19, 2013   (JP) ................. 2013-238913

(51) Int. Cl.
*H02M 3/335* (2006.01)
*H02M 3/337* (2006.01)

(52) U.S. Cl.
CPC ........ *H02M 3/3376* (2013.01); *H02M 3/33592* (2013.01)

(58) Field of Classification Search
CPC .......................... H02M 3/3376; H02M 3/33592
USPC .......................................................... 363/17
See application file for complete search history.

(56) References Cited

U.S. PATENT DOCUMENTS

| | | | |
|---|---|---|---|
| 6,952,093 B1 | 10/2005 | Broach et al. | |
| 2009/0284235 A1 | 11/2009 | Weng et al. | |
| 2011/0198933 A1* | 8/2011 | Ishigaki ................. | B60R 25/00 307/66 |
| 2012/0020120 A1 | 1/2012 | Yanagita | |
| 2012/0299503 A1 | 11/2012 | Aharon | |

FOREIGN PATENT DOCUMENTS

| | | |
|---|---|---|
| JP | 2009278766 A | 11/2009 |
| JP | 2011-193713 A | 9/2011 |

* cited by examiner

*Primary Examiner* — Adolf Berhane
*Assistant Examiner* — Afework Demisse
(74) *Attorney, Agent, or Firm* — Sughrue Mion, PLLC

(57) ABSTRACT

The power correction method corrects transmitted power, which is transmitted between a primary side circuit and a secondary side circuit which is connected to the primary side circuit via a reactor and magnetically coupled with the primary side circuit via a transformer and is adjusted according to a phase difference between switching of the primary side circuit and switching of the secondary side circuit. The method includes a switching step of turning on first transistor and second transistor; a voltage applying step of applying a predetermined voltage; a switching step of turning on a third transistor and a fourth transistor; a delay time measurement step of measuring delay time; a slope measurement step of measuring slope of the current; and a correction step of correcting the transmitted power.

6 Claims, 5 Drawing Sheets

POWER CONVERSION APPARATUS AND POWER CORRECTION METHOD

INCORPORATION BY REFERENCE

The disclosure of Japanese Patent Application No. 2013-238913 filed on Nov. 19, 2013 including the specification, drawings and abstract is incorporated herein by reference in its entirety.

BACKGROUND OF THE INVENTION

1. Field of the Invention

The invention relates to a power conversion apparatus and a power correction method.

2. Description of Related Art

A power conversion apparatus which adjusts transmitted power transmitted between a primary side conversion circuit and a secondary side conversion circuit which is magnetically coupled with the primary side conversion circuit via a transformer by changing a phase difference between switching of the primary side conversion circuit and switching of the secondary side conversion circuit is known (see Japanese Patent Application Publication No. 2011-193713 (JP 2011-193713 A), for example).

However, since a deviation often occurs in circuit constant of a magnetic element such as the transformer and switching timing of a conversion circuits such as the primary side conversion circuit, it is difficult to be close to a desired value of the transmitted power.

SUMMARY OF THE INVENTION

Therefore, an object of the invention is to perform power transmission with high accuracy.

In order to achieve the above object, one aspect of the invention is a power correction method of correcting transmitted power, which is transmitted between a primary side circuit and a secondary side circuit which is connected to the primary side circuit via a reactor and magnetically coupled with the primary side circuit via a transformer and is adjusted in accordance with a phase difference between switching of the primary side circuit and switching of the secondary side circuit, including: switching by turning on a first transistor and a second transistor which are connected to a negative electrode bus line of the primary side circuit; applying a predetermined voltage between a positive electrode bus line and a negative electrode bus line of the secondary side circuit; switching by turning on a third transistor which is connected to the positive electrode bus line of the secondary side circuit and a fourth transistor which is connected to the third transistor via the reactor and is connected to the negative electrode bus line of the secondary side circuit; measuring delay time since turning on the third transistor and the fourth transistor until current starts flowing in the first transistor and the second transistor; measuring a slope of the current flowing in the first transistor and the second transistor; and correcting the transmitted power in accordance with the measured value of the slope and the measured value of the delay time.

According to one embodiment, it is possible to perform power transmission with high accuracy.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

<Configuration of Power Supply Apparatus 101>

Figure 1:
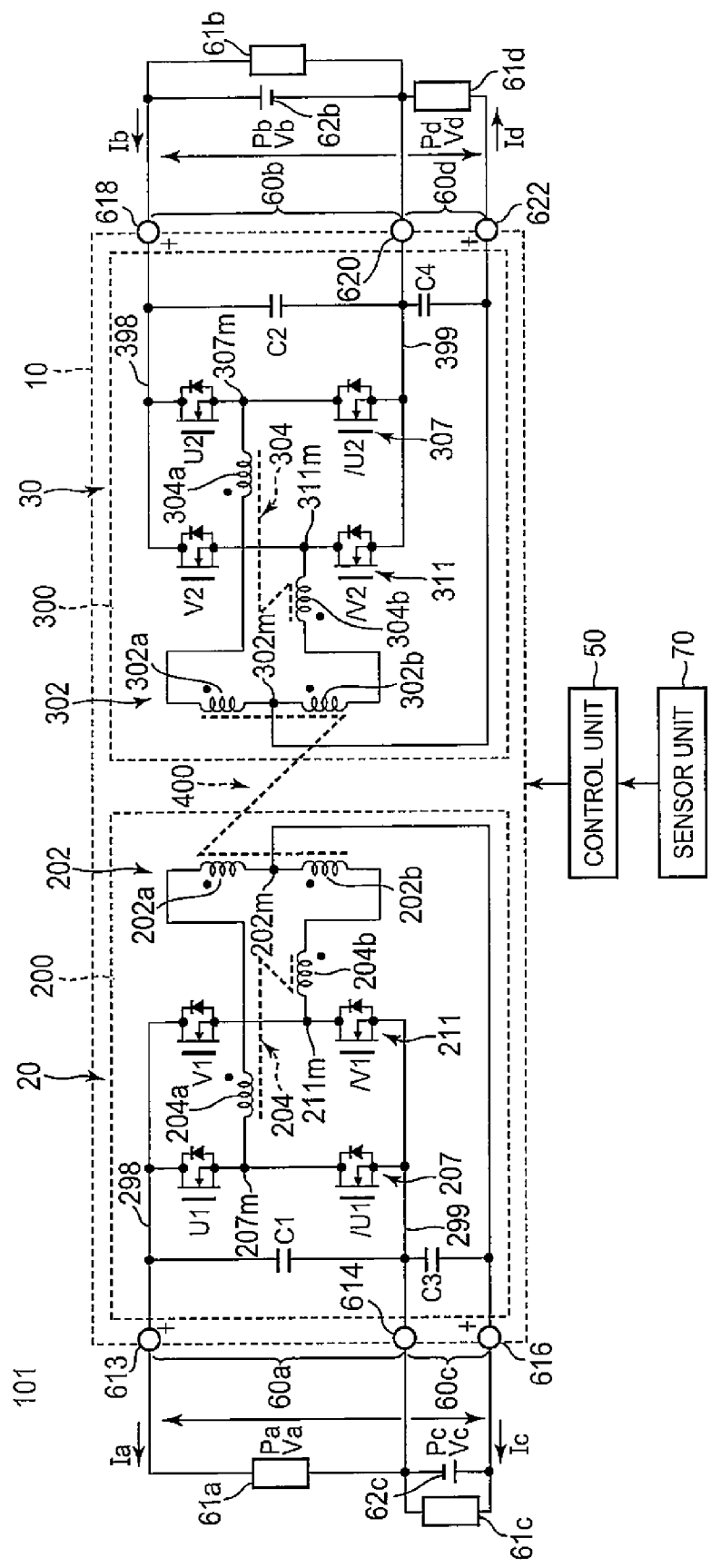
FIG. 1 is a diagram showing an example of a configuration of a power conversion apparatus.

FIG. 1 is a block diagram showing an example of a configuration of a power supply apparatus 101 serving as an embodiment of a power conversion apparatus. For example, the power supply apparatus 101 is a power supply system that includes a power supply circuit 10, a control unit 50, and a sensor unit 70. For example, the power supply apparatus 100 is a system that is mounted on a vehicle such as an automobile, and distributes power to various loads of the vehicle. A hybrid vehicle, a plug-in hybrid vehicle, an electric vehicle, and so on may be cited as specific examples of this vehicle.

For example, the power supply apparatus 101 includes, as primary side ports, a first input/output port 60a to which a primary side high voltage system load 61a is connected and a second input/output port 60c to which a primary side low voltage system load 61c and a primary side low voltage system power supply 62c are connected. The primary side low voltage system power supply 62c supplies power to the primary side low voltage system load 61c, which is operated by an identical voltage system (a 12 V system, for example) to the primary side low voltage system power supply 62c. Further, the primary side low voltage system power supply 62c supplies power stepped up by a primary side conversion circuit 20 provided in the power supply circuit 10 to the primary side high voltage system load 61a, which is operated by a different voltage system (a higher 48 V system than the 12 V system, for example) to the primary side low voltage system power supply 62c. A secondary battery such as a lead battery may be cited as a specific example of the primary side low voltage system power supply 62c.

For example, the power supply apparatus 101 includes, as secondary side ports, a third input/output port 60b to which a secondary side high voltage system load 61b and a secondary side high voltage system power supply 62b are connected and a fourth input/output port 60d to which a secondary side low voltage system load 61d is connected. The secondary side high voltage system power supply 62b supplies power to the secondary side high voltage system load 61b, which is operated by an identical voltage system (a higher 288 V system than the 12 V system and the 48 V system, for example) to the secondary side high voltage system power supply 62b. Further, the secondary side high voltage system power supply 62b supplies power stepped down by a secondary side conversion circuit 30 provided in the power supply circuit 10 to the secondary side low voltage system load 61d, which is operated by a different voltage system (a lower 72 V system than the 288 V system, for example) to the secondary side high voltage system power supply 62b. A secondary battery such as a lithium ion battery may be cited as a specific example of the secondary side high voltage system power supply 62b.

The power supply circuit 10 is a power conversion circuit that includes the four input/output ports described above and has functions for selecting two desired input/output ports from the four input/output ports and performing power conversion between the two selected input/output ports. Further, the power supply apparatus 101 including the power supply circuit 10 may be an apparatus that includes a plurality of, at least three, input/output ports, and is capable of converting power between any two input/output ports from the plurality of, at least three, input/output ports and performing power conversion between the two selected input/output ports. For example, the power supply circuit 10 may be a circuit that has three input/output ports without the fourth input/output port 60d.

Port powers Pa, Pc, Pb, Pd are input/output powers (input powers or output powers) of the first input/output port 60a, the second input/output port 60c, the third input/output port 60b, and the fourth input/output port 60d, respectively. Port voltages Va, Vc, Vb, Vd are input/output voltages (input voltages or output voltages) of the first input/output port 60a, the second input/output port 60c, the third input/output port 60b, and the fourth input/output port 60d, respectively. Port currents Ia, Ic, Ib, Id are input/output currents (input currents or output currents) of the first input/output port 60a, the second input/output port 60c, the third input/output port 60b, and the fourth input/output port 60d, respectively.

The power supply circuit 10 includes a capacitor C1 provided in the first input/output port 60a, a capacitor C3 provided in the second input/output port 60c, a capacitor C2 provided in the third input/output port 60b, and a capacitor C4 provided in the fourth input/output port 60d. Film capacitors, aluminum electrolytic capacitors, ceramic capacitors, polymer electrolytic capacitors, and so on may be cited as specific examples of the capacitors C1, C2, C3, C4.

The capacitor C1 is inserted between a high potential side terminal 613 of the first input/output port 60a and a low potential side terminal 614 of the first input/output port 60a and the second input/output port 60c. The capacitor C3 is inserted between a high potential side terminal 616 of the second input/output port 60c and the low potential side terminal 614 of the first input/output port 60a and the second input/output port 60c. The capacitor C2 is inserted between a high potential side terminal 618 of the third input/output port 60b and a low potential side terminal 620 of the third input/output port 60b and the fourth input/output port 60d. The capacitor C4 is inserted between a high potential side terminal 622 of the fourth input/output port 60d and the low potential side terminal 620 of the third input/output port 60b and the fourth input/output port 60d.

The capacitors C1, C2, C3, C4 may be provided either inside or outside the power supply circuit 10.

The power supply circuit 10 is a power conversion circuit configured to include the primary side conversion circuit 20 and the secondary side conversion circuit 30. Note that the primary side conversion circuit 20 and the secondary side conversion circuit 30 are connected via a primary side magnetic coupling reactor 204 and a secondary side magnetic coupling reactor 304, and magnetically coupled by a transformer 400 (a center tapped transformer). A primary side port configured of the first input/output port 60a and the second input/output port 60c is connected with a secondary side port configured of the third input/output port 60b and the fourth input/output port 60d via the transformer 400.

The primary side conversion circuit 20 is a primary side circuit configured to include a primary side full bridge circuit 200, the first input/output port 60a, and the second input/output port 60c. The primary side full bridge circuit 200 is a primary side power conversion unit configured to include a primary side coil 202 of the transformer 400, the primary side magnetic coupling reactor 204, a primary side first upper arm U1, a primary side first lower arm /U1, a primary side second upper arm V1, and a primary side second lower arm /V1. Here, the primary side first upper arm U1, the primary side first lower arm /U1, the primary side second upper arm V1, and the primary side second lower arm /V1 are constituted by switching elements respectively configured to include, for example, an N channel type metal oxide semiconductor field effect transistor (MOSFET) and a body diode serving as a parasitic element of the MOSFET. Additional diodes may be connected to the MOSFET in parallel.

The primary side full bridge circuit 200 includes a primary side positive electrode bus line 298 connected to the high potential side terminal 613 of the first input/output port 60a, and a primary side negative electrode bus line 299 connected to the low potential side terminal 614 of the first input/output port 60a and the second input/output port 60c.

A primary side first arm circuit 207 connecting the primary side first upper arm U1 and the primary side first lower arm /U1 in series is attached between the primary side positive electrode bus line 298 and the primary side negative electrode bus line 299. The primary side first arm circuit 207 is a primary side first power conversion circuit unit (a primary side U phase power conversion circuit unit) capable of performing a power conversion operation by switching the primary side first upper arm U1 and the primary side first lower arm /U1 ON and OFF. Further, a primary side second arm circuit 211 connecting the primary side second upper arm V1 and the primary side second lower arm /V1 in series is attached between the primary side positive electrode bus line 298 and the primary side negative electrode bus line 299 in parallel with the primary side first arm circuit 207. The primary side second arm circuit 211 is a primary side second power conversion circuit unit (a primary side V phase power conversion circuit unit) capable of performing a power conversion operation by switching the primary side second upper arm V1 and the primary side second lower arm /V1 ON and OFF.

The primary side coil 202 and the primary side magnetic coupling reactor 204 are provided in a bridge part connecting a midpoint 207m of the primary side first arm circuit 207 to a midpoint 211m of the primary side second arm circuit 211. To describe connection relationships to the bridge part in more detail, one end of a primary side first reactor 204a of the primary side magnetic coupling reactor 204 is connected to the midpoint 207m of the primary side first arm circuit 207, and one end of the primary side coil 202 is connected to another end of the primary side first reactor 204a. Further, one end of a primary side second reactor 204b of the primary side magnetic coupling reactor 204 is connected to another end of the primary side coil 202, and another end of the primary side second reactor 204b is connected to the midpoint 211m of the primary side second arm circuit 211. Note that the primary side magnetic coupling reactor 204 is configured to include the primary side first reactor 204a and the primary side second reactor 204b, which is magnetically coupled to the primary side first reactor 204a by a coupling coefficient $k_1$.

The midpoint 207m is a primary side first intermediate node between the primary side first upper arm U1 and the primary side first lower arm /U1, and the midpoint 211m is a primary side second intermediate node between the primary side second upper arm V1 and the primary side second lower arm /V1.

The first input/output port 60a is a port provided between the primary side positive electrode bus line 298 and the primary side negative electrode bus line 299. The first input/output port 60a is configured to include the terminal 613 and the terminal 614. The second input/output port 60c is a port provided between the primary side negative electrode bus line 299 and a center tap 202m of the primary side coil 202. The second input/output port 60c is configured to include the terminal 614 and the terminal 616.

The center tap 202m is connected to the high potential side terminal 616 of the second input/output port 60c. The center tap 202m is an intermediate connection point between a primary side first winding 202a and a primary side second winding 202b constituting the primary side coil 202.

The secondary side conversion circuit 30 is a secondary side circuit configured to include a secondary side full bridge circuit 300, the third input/output port 60b, and the fourth input/output port 60d. The secondary side full bridge circuit 300 is a secondary side power conversion unit configured to include a secondary side coil 302 of the transformer 400, the secondary side magnetic coupling reactor 304, a secondary side first upper arm U2, a secondary side first lower arm /U2, a secondary side second upper arm V2, and a secondary side second lower arm /V2. Here, the secondary side first upper arm U2, the secondary side first lower arm /U2, the secondary side second upper arm V2, and the secondary side second lower arm /V2 are constituted by switching elements respectively configured to include, for example, an N channel type MOSFET and a body diode serving as a parasitic element of the MOSFET. Additional diodes may be connected to the MOSFET in parallel.

The secondary side full bridge circuit 300 includes a secondary side positive electrode bus line 398 connected to the high potential side terminal 618 of the third input/output port 60b, and a secondary side negative electrode bus line 399 connected to the low potential side terminal 620 of the third input/output port 60b and the fourth input/output port 60d.

A secondary side first arm circuit 307 connecting the secondary side first upper arm U2 and the secondary side first lower arm /U2 in series is attached between the secondary side positive electrode bus line 398 and the secondary side negative electrode bus line 399. The secondary side first arm circuit 307 is a secondary side first power conversion circuit unit (a secondary side U phase power conversion circuit unit) capable of performing a power conversion operation by switching the secondary side first upper arm U2 and the secondary side first lower arm /U2 ON and OFF. Further, a secondary side second arm circuit 311 connecting the secondary side second upper arm V2 and the secondary side second lower arm /V2 in series is attached between the secondary side positive electrode bus line 398 and the secondary side negative electrode bus line 399 in parallel with the secondary side first arm circuit 307. The secondary side second arm circuit 311 is a secondary side second power conversion circuit unit (a secondary side V phase power conversion circuit unit) capable of performing a power conversion operation by switching the secondary side second upper arm V2 and the secondary side second lower arm /V2 ON and OFF.

The secondary side coil 302 and the secondary side magnetic coupling reactor 304 are provided in a bridge part connecting a midpoint 307m of the secondary side first arm circuit 307 to a midpoint 311m of the secondary side second arm circuit 311. To describe connection relationships to the bridge part in more detail, one end of a secondary side first reactor 304a of the secondary side magnetic coupling reactor 304 is connected to the midpoint 307m of the secondary side first arm circuit 307, and one end of the secondary side coil 302 is connected to another end of the secondary side first reactor 304a. Further, one end of a secondary side second reactor 304b of the secondary side magnetic coupling reactor 304 is connected to another end of the secondary side coil 302, and another end of the secondary side second reactor 304b is connected to the midpoint 311m of the secondary side second arm circuit 311. Note that the secondary side magnetic coupling reactor 304 is configured to include the secondary side first reactor 304a and the secondary side second reactor 304b, which is magnetically coupled to the secondary side first reactor 304a by a coupling coefficient $k_2$.

The midpoint 307m is a secondary side first intermediate node between the secondary side first upper arm U2 and the secondary side first lower arm /U2, and the midpoint 311m is a secondary side second intermediate node between the secondary side second upper arm V2 and the secondary side second lower arm /V2.

The third input/output port 60b is a port provided between the secondary side positive electrode bus line 398 and the secondary side negative electrode bus line 399. The third input/output port 60b is configured to include the terminal 618 and the terminal 620. The fourth input/output port 60d is a port provided between the secondary side negative electrode bus line 399 and a center tap 302m of the secondary side coil 302. The fourth input/output port 60d is configured to include the terminal 620 and the terminal 622.

The center tap 302m is connected to the high potential side terminal 622 of the fourth input/output port 60d. The center tap 302m is an intermediate connection point between a secondary side first winding 302a and a secondary side second winding 302b constituting the secondary side coil 302.

In FIG. 1, the power supply apparatus 101 includes the sensor unit 70. The sensor unit 70 serves as detecting means that detects an input/output value Y of at least one of the first to fourth input/output ports 60a, 60c, 60b, 60d at predetermined detection period intervals and outputs a detection value Yd corresponding to the detected input/output value Y to the control unit 50. The detection value Yd may be a detected voltage obtained by detecting the input/output voltage, a detected current obtained by detecting the input/output current, or a detected power obtained by detecting the input/output power. The sensor unit 70 may be provided either inside or outside the power supply circuit 10.

The sensor unit 70 includes, for example, a voltage detection unit that detects the input/output voltage generated in at least one of the first to fourth input/output ports 60a, 60c, 60b, 60d. For example, the sensor unit 70 includes a primary side voltage detection unit that outputs at least one detected voltage from among an input/output voltage Va and an input/output voltage Vc as a primary side voltage detection value, and a secondary side voltage detection unit that outputs at least one detected voltage from among an input/output voltage Vb and an input/output voltage Vd as a secondary side voltage detection value.

The voltage detection unit of the sensor unit 70 includes, for example, a voltage sensor that monitors an input/output voltage value of at least one port, and a voltage detection circuit that outputs a detected voltage corresponding to the input/output voltage value monitored by the voltage sensor to the control unit 50.

The sensor unit 70 includes, for example, a current detection unit that detects the input/output current flowing through at least one of the first to fourth input/output ports 60a, 60c, 60b, 60d. For example, the sensor unit 70 includes a primary, side current detection unit that outputs at least one detected current from among an input/output current Ia and an input/output current Ic as a primary side current detection value, and a secondary side current detection unit that outputs at least one detected current from among an input/output current Ib and an input/output current Id as a secondary side current detection value.

The current detection unit of the sensor unit 70 includes, for example, a current sensor that monitors an input/output current value of at least one port, and a current detection circuit that outputs a detected current corresponding to the input/output current value monitored by the current sensor to the control unit 50.

The power supply apparatus 101 includes the control unit 50. For example, the control unit 50 is an electronic circuit that includes a microcomputer having an inbuilt central processing unit (CPU). The control unit 50 may be provided either inside or outside the power supply circuit 10.

The control unit 50 feedback-controls a power conversion operation performed by the power supply circuit 10 such that the detected value Yd of the input/output value Y of at least one of the first to fourth input/output ports 60*a*, 60*c*, 60*b*, 60*d* converges to a target value Yo set in the port. For example, the target value Yo is a command value set by the control unit 50 or a predetermined apparatus other than the control unit 50 on the basis of driving conditions defined in relation to the respective loads (the primary side low voltage system load 61*c* and so on, for example) connected to the input/output ports. The target value Yo functions as an output target value when power is output from the port and an input target value when power is input into the port, and may be a target voltage value, a target current value, or a target power value.

Further, the control unit 50 feedback-controls the power conversion operation performed by the power supply circuit 10 such that a transmitted power P transmitted between the primary side conversion circuit 20 and the secondary side conversion circuit 30 via the transformer 400 converges to a set target transmitted power Po. The transmitted power will also be referred to as a power transmission amount. For example, the target transmitted power Po is a command value set by the control unit 50 or a predetermined apparatus other than the control unit 50 on the basis of a deviation between the detected value Yd and the target value Yo in one of the ports.

The control unit 50 feedback-controls the power conversion operation performed by the power supply circuit 10 by varying a value of a predetermined control parameter X, and is thus capable of adjusting the respective input/output values Y of the first to fourth input/output ports 60*a*, 60*c*, 60*b*, 60*d* of the power supply circuit 10. Control variables such a phase difference $\phi$, a duty ratio D (an ON time $\delta$), and an equivalent inductance L are used as the main control parameters X.

The phase difference $\phi$ is a deviation (a time lag) between switching timings of identical-phase power conversion circuit units of the primary side full bridge circuit 200 and the secondary side full bridge circuit 300. The duty ratio D (the ON time $\delta$) is a duty ratio (an ON time) between switching waveforms of the respective power conversion circuit units constituting the primary side full bridge circuit 200 and the secondary side full bridge circuit 300.

The equivalent inductance L is determined by leakage inductance of a magnetic element, and is a combined inductance obtained by combining the leakage inductance of the primary side magnetic coupling reactor 204, the leakage inductance of the secondary side magnetic coupling reactor, and the leakage inductance of the transformer 400.

The above control parameters X can be controlled independently of each other. The control unit 50 varies the input/output values Y of the respective input/output ports of the power supply circuit 10 by performing duty ratio control and/or equivalent inductance control and/or phase control on the primary side full bridge circuit 200 and the secondary side full bridge circuit 300 using the phase difference $\phi$, the equivalent inductance L and the duty ratio D (the ON time $\delta$).

Figure 2:
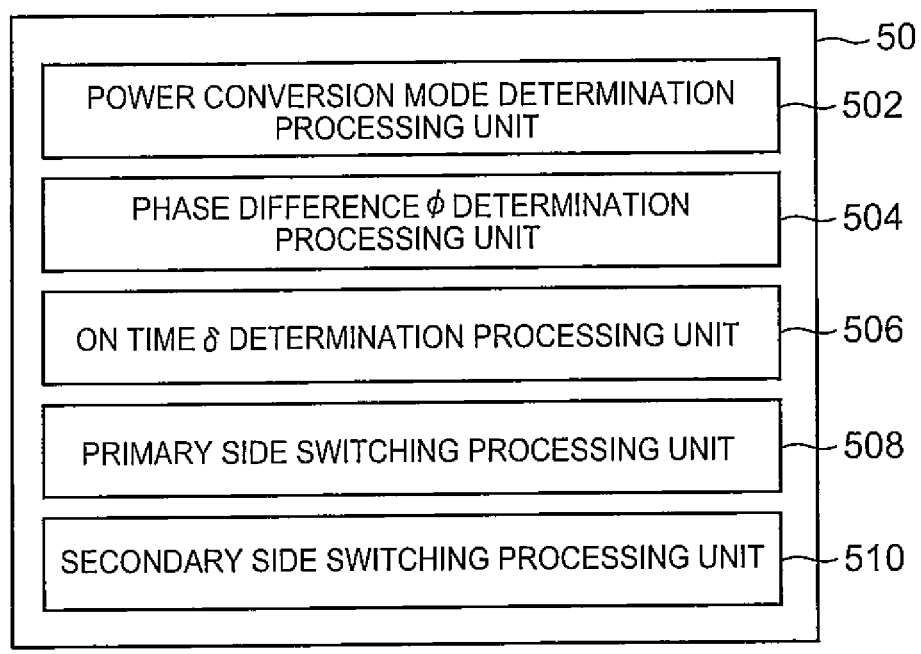
FIG. 2 is a diagram showing an example of a configuration of a control unit.

FIG. 2 is a block diagram of the control unit 50. The control unit 50 is a control unit having a function for performing switching control on the respective switching elements of the primary side conversion circuit 20, such as the primary side first upper arm U1, and the respective switching elements of the secondary side conversion circuit 30, such as the secondary side first upper arm U2. The control unit 50 is configured to include a power conversion mode determination processing unit 502, a phase difference $\phi$ determination processing unit 504, an ON time $\delta$ determination processing unit 506, a primary side switching processing unit 508, and a secondary side switching processing unit 510. For example, the control unit 50 is an electronic circuit that includes a microcomputer having an inbuilt CPU.

For example, the power conversion mode determination processing unit 502 selects and sets an operating mode from among power conversion modes A to L of the power supply circuit 10, to be described below, on the basis of a predetermined external signal (for example, a signal indicating the deviation between the detected value Yd and the target value Yo in one of the ports). As regards the power conversion modes, in mode A, power input from the first input/output port 60*a* is converted and output to the second input/output port 60*c*. In mode B, power input from the first input/output port 60*a* is converted and output to the third input/output port 60*b*. In mode C, power input from the first input/output port 60*a* is converted and output to the fourth input/output port 60*d*.

In mode D, power input from the second input/output port 60*c* is converted and output to the first input/output port 60*a*. In mode E, power input from the second input/output port 60*c* is converted and output to the third input/output port 60*b*. In mode F, power input from the second input/output port 60*c* is converted and output to the fourth input/output port 60*d*.

In mode G, power input from the third input/output port 60*b* is converted and output to the first input/output port 60*a*. In mode H, power input from the third input/output port 60*b* is converted and output to the second input/output port 60*c*. In mode L, power input from the third input/output port 60*b* is converted and output to the fourth input/output port 60*d*.

In mode J, power input from the fourth input/output port 60*d* is converted and output to the first input/output port 60*a*. In mode K, power input from the fourth input/output port 60*d* is converted and output to the second input/output port 60*c*. In mode L, power input from the fourth input/output port 60*d* is converted and output to the third input/output port 60*b*.

The phase difference $\phi$ determination processing unit 504 has a function for setting a phase difference $\phi$ between switching period motions of the switching elements between the primary side conversion circuit 20 and the secondary side conversion circuit 30 in order to cause the power supply circuit 10 to function as a direct current-direct current (DC-DC) converter circuit.

The ON time $\delta$ determination processing unit 506 has a function for setting an ON time $\delta$ of the switching elements of the primary side conversion circuit 20 and the secondary side conversion circuit 30 in order to cause the primary side conversion circuit 20 and the secondary side conversion circuit 30 to function respectively as step-up/step-down circuits.

The primary side switching processing unit 508 has a function for performing switching control on the respective switching elements constituted by the primary side first upper arm U1, the primary side first lower arm /U1, the primary side second upper arm V1, and the primary side second lower arm /V1, on the basis of outputs of the power conversion mode determination processing unit 502, the phase difference φ determination processing unit 504, and the ON time δ determination processing unit 506.

The secondary side switching processing unit 510 has a function for performing switching control on the respective switching elements constituted by the secondary side first upper arm U2, the secondary side first lower arm /U2, the secondary side second upper arm V2, and the secondary side second lower arm /V2, on the basis of the outputs of the power conversion mode determination processing unit 502, the phase difference φ determination processing unit 504, and the ON time δ determination processing unit 506.

Processing units included by the control unit 50 are not limited to the power conversion mode determination processing unit 502, the phase difference φ determination processing unit 504, the ON time δ determination processing unit 506, the primary side switching processing unit 508, and the secondary side switching processing unit 510 as described above. As will be described later in detail, for example, the control unit 50 may further include a voltage applying processing unit for applying a predetermined voltage to each input/output port (for example, the first input/output port 60a, the second input/output port 60c, the third input/output port 60b, the fourth input/output port 60d), a delay time measurement processing unit for measuring delay time, a slope measurement processing unit for measuring a slope of current flowing in each switching element, a calculation processing unit for calculating a equivalent inductance, and the like. That is, the control unit 50 is capable of performing various processes required to control the transmission power.

<Operation of Power Supply Apparatus 101>

An operation of the power supply apparatus 101 having the above configuration will now be described using FIGS. 1 and 2. When, for example, an external signal requesting an operation in which the power conversion mode of the power supply circuit 10 is set at mode F is input, the power conversion mode determination processing unit 502 of the control unit 50 sets the power conversion mode of the power supply circuit 10 to mode F. At this time, a voltage input into the second input/output port 60c is stepped up by a step-up function of the primary side conversion circuit 20, whereupon power having the stepped-up voltage is transmitted to the third input/output port 60b side by a DC-DC converter circuit function of the power supply circuit 10, stepped down by a step-down function of the secondary side conversion circuit 30, and then output from the fourth input/output port 60d.

Here, a step-up/step-down function of the primary side conversion circuit 20 will be described in detail. Focusing on the second input/output port 60c and the first input/output port 60a, the terminal 616 of the second input/output port 60c is connected to the midpoint 207m of the primary side first arm circuit 207 via the primary side first winding 202a and the primary side first reactor 204a connected in series to the primary side first winding 202a. Respective ends of the primary side first arm circuit 207 are connected to the first input/output port 60a, and as a result, a step-up/step-down circuit is attached between the terminal 616 of the second input/output port 60c and the first input/output port 60a.

The terminal 616 of the second input/output port 60c is also connected to the midpoint 211m of the primary side second arm circuit 211 via the primary side second winding 202b and the primary side second reactor 204b connected in series to the primary side second winding 202b. Respective ends of the primary side second arm circuit 211 are connected to the first input/output port 60a, and as a result, a step-up/step-down circuit is attached in parallel between the terminal 616 of the second input/output port 60c and the first input/output port 60a. Note that since the secondary side conversion circuit 30 is a circuit having a substantially identical configuration to the primary side conversion circuit 20, two step-up/step-down circuits are likewise connected in parallel between the terminal 622 of the fourth input/output port 60d and the third input/output port 60b. Hence, the secondary side conversion circuit 30 has an identical step-up/step-down function to the primary side conversion circuit 20.

Next, the function of the power, supply circuit 10 as a DC-DC converter circuit will be described in detail. Focusing on the first input/output port 60a and the third input/output port 60b, the primary side full bridge circuit 200 is connected to the first input/output port 60a, and the secondary side full bridge circuit 300 is connected to the third input/output port 60b. When the primary side coil 202 provided in the bridge part of the primary side full bridge circuit 200 and the secondary side coil 302 provided in the bridge part of the secondary side full bridge circuit 300 are magnetically coupled by a coupling coefficient $k_T$, the transformer 400 functions as a center tapped transformer having a number of windings 1:N. Hence, by adjusting the phase difference φ between the switching period motions of the switching elements in the primary side full bridge circuit 200 and the secondary side full bridge circuit 300, power input into the first input/output port 60a can be converted and transmitted to the third input/output port 60b or power input into the third input/output port 60b can be converted and transmitted to the first input/output port 60a.

Figure 3:
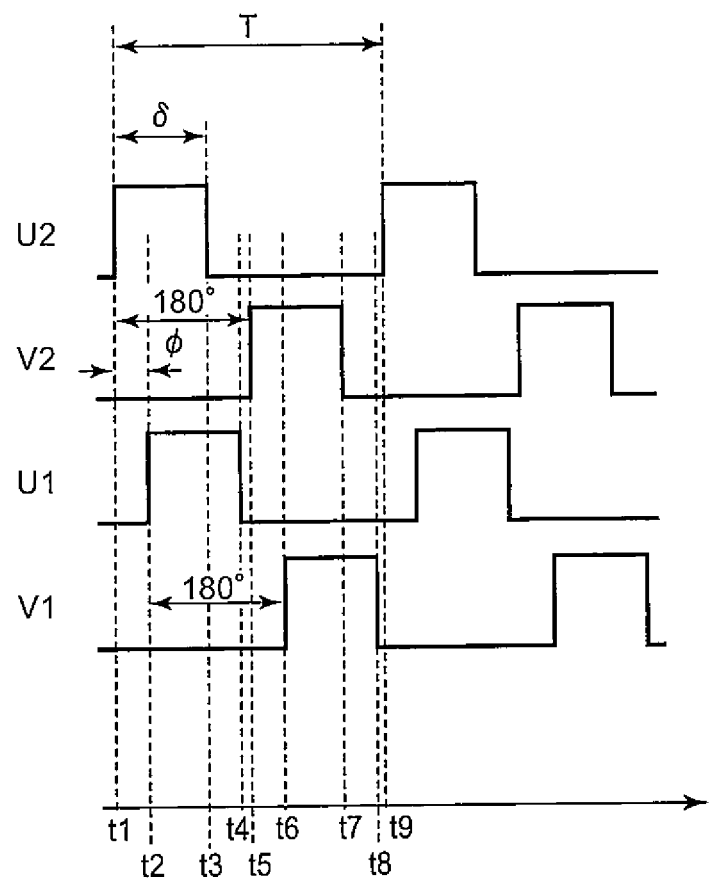
FIG. 3 is a timing chart showing an example of switching operations of a primary side circuit and a secondary side circuit.

FIG. 3 is a view showing a timing chart of ON/OFF switching waveforms of the respective arms provided in the power supply circuit 10 resulting from control executed by the control unit 50. In FIG. 3, U1 is an ON/OFF waveform of the primary side first upper arm U1, V1 is an ON/OFF waveform of the primary side second upper arm V1, U2 is an ON/OFF waveform of the secondary side first upper arm U2, and V2 is an ON/OFF waveform of the secondary side second upper arm V2. ON/OFF waveforms of the primary side first lower arm /U1, the primary side second lower arm /V1, the secondary side first lower arm /U2, and the secondary side second lower arm /V2 are inverted waveforms (not shown) obtained by respectively inverting the ON/OFF waveform of the primary side first upper arm U1, the primary side second upper arm V1, the secondary side first upper arm U2, and the secondary side second upper arm V2. Note that dead time is preferably provided between the respective ON/OFF waveforms of the upper and lower arms to prevent a through current from flowing when both the upper and lower arms are switched ON. Further, in FIG. 3, a high level indicates an ON condition and a low level indicates an OFF condition.

Here, by modifying the respective ON times δ of U1, V1, U2, and V2, step-up/step-down ratios of the primary side conversion circuit 20 and the secondary side conversion circuit 30 can be modified. For example, by making the respective ON times δ of U1, V1, U2, and V2 equal to each other, the step-up/step-down ratio of the primary side conversion circuit 20 can be made equal to the step-up/step-down ratio of the secondary side conversion circuit 30.

The ON time δ determination processing unit 506 make the respective ON times δ of U1, V1, U2, and V2 equal to each other (respective ON times δ=primary side ON time δ11=secondary side ON time δ12=time value α) so that the respective step-up/step-down ratios of the primary side conversion circuit 20 and the secondary side conversion circuit 30 are equal to each other.

The step-up/step-down ratio of the primary side conversion circuit 20 is determined by the duty ratio D, which is a proportion of a switching period T of the switching elements (arms) constituting the primary side full bridge circuit 200 occupied by the ON time δ. Similarly, the step-up/step-down ratio of the secondary side conversion circuit 30 is determined by the duty ratio D, which is a proportion of the switching period T of the switching elements (arms) constituting the secondary side full bridge circuit 300 occupied by the ON time δ. The step-up/step-down ratio of the primary side conversion circuit 20 is a transformation ratio between the first input/output port 60a and the second input/output port 60c, while the step-up/step-down ratio of the secondary side conversion circuit 30 is a transformation ratio between the third input/output port 60b and the fourth input/output port 60d.

Therefore, for example, the step-up/step-down ratio of the primary side conversion circuit 20=the voltage of the second input/output port 60c/the voltage of the first input/output port 60a=δ11/T=α/T, and the step-up/step-down ratio of the secondary side conversion circuit 30=the voltage of the fourth input/output port 60d/the voltage of the third input/output port 60b=δ12/T=α/T. In other words, the respective step-up/step-down ratios of the primary side conversion circuit 20 and the secondary side conversion circuit 30 take identical values (=α/T).

Note that the ON time δ in FIG. 3 represents both the ON time δ11 of the primary side first upper arm U11 and the primary side second upper arm V1 and the ON time δ12 of the secondary side first upper arm U2 and the secondary side second upper arm V2. Further, the switching period T of the arms constituting the primary side full bridge circuit 200 and the switching period T of the arms constituting the secondary side full bridge circuit 300 are equal times.

Furthermore, a phase difference between U1 and V1 is activated at 180 degrees (π), and a phase difference between U2 and V2 is likewise activated at 180 degrees (π). Moreover, by changing the phase difference φ between U1 and U2, the power transmission amount P between the primary side conversion circuit 20 and the secondary side conversion circuit 30 can be adjusted such that when the phase difference φ>0, power can be transmitted from the primary side conversion circuit 20 to the secondary side conversion circuit 30, and when the phase difference φ<0, power can be transmitted from the secondary side conversion circuit 30 to the primary side conversion circuit 20.

The phase difference φ is a deviation (a time lag) between the switching timings of identical-phase power conversion circuit units of the primary side full bridge circuit 200 and the secondary side full bridge circuit 300. For example, the phase difference φ is a deviation between the switching timings of the primary side first arm circuit 207 and the secondary side first arm circuit 307, and a deviation between the switching timings of the primary side second arm circuit 211 and the secondary side second arm circuit 311. These deviations are controlled to be equal to each other. In other words, the phase difference φ between U1 and U2 and the phase difference φ between V1 and V2 are controlled to identical values.

Hence, when, for example, an external signal requesting an operation in which the power conversion mode of the power supply circuit 10 is set at mode F is input, the power conversion mode determination processing unit 502 selects and sets mode F. The ON time δ determination processing unit 506 then sets the ON time to define a step-up ratio required when the primary side conversion circuit 20 is caused to function as a step-up circuit that steps up the voltage input into the second input/output port 60c and outputs the stepped-up voltage to the first input/output port 60a. Note that the secondary side conversion circuit 30 functions as a step-down circuit that steps down the voltage input into the third input/output port 60b at a step-down ratio defined in accordance with the ON time δ set by the ON time δ determination processing unit 506, and outputs the stepped-down voltage to the fourth input/output port 60d. Further, the phase difference φ determination processing unit 504 sets the phase difference φ such that the power input into the first input/output port 60a is transmitted to the third input/output port 60b in the desired power transmission amount P.

The primary side switching processing unit 508 performs switching control on the respective switching elements constituted by the primary side first upper arm U1, the primary side first lower arm /U1, the primary side second upper arm V1, and the primary side second lower arm /V1 to cause the primary side conversion circuit 20 to function as a step-up circuit and to cause the primary side conversion circuit 20 to function as a part of a DC-DC converter circuit.

The secondary side switching processing unit 510 performs switching control on the respective switching elements constituted by the secondary side first upper arm U2, the secondary side first lower arm /U2, the secondary side second upper arm V2, and the secondary side second lower arm /V2 to cause the secondary side conversion circuit 30 to function as a step-down circuit and to cause the secondary side conversion circuit 30 to function as a part of a DC-DC converter circuit.

As described above, the primary side conversion circuit 20 and the secondary side conversion circuit 30 can be caused to function as a step-up circuit or a step-down circuit, and the power supply circuit 10 can be caused to function as a bidirectional DC-DC converter circuit. Therefore, power conversion can be performed in all of the power conversion modes A to L, or in other words, power conversion can be performed between two input/output ports selected from the four input/output ports.

The transmitted power P (also referred to as the power transmission amount P) adjusted by the control unit 50 in accordance with the phase difference φ, the equivalent inductance L and so on is power transmitted from one of the primary side conversion circuit 20 and the secondary side conversion circuit 30 to the other via the transformer 400, and is expressed as $$P=(N \times Va \times Vb)/(\pi \times \omega \times L) \times F(D,\phi) \qquad \text{Equation 1}$$

Note that N is a winding ratio of the transformer 400, Va is the input/output voltage of the first input/output port 60a (a voltage between the primary side positive electrode bus line 298 and the primary side negative electrode bus line 299 of the primary conversion circuit 20), Vb is the input/output voltage of the third input/output port 60b (a voltage between the primary side positive electrode bus line 398 and the secondary side negative electrode bus line 399 of the secondary conversion circuit 30), π is pi, ω (=2π×f=2π/T) is an angular frequency of the switching operations of the primary side conversion circuit 20 and the secondary side conversion circuit 30, f is a switching frequency of the primary side conversion circuit 20 and the secondary side conversion circuit 30, T is the switching period of the primary side conversion circuit 20 and the secondary side conversion circuit 30, L is an equivalent inductance of the magnetic coupling reactors 204, 304 and the transformer 400 relating to power transmission, and F (D, φ) is a function having the duty ratio D and the phase difference φ as variables and a variable that increases monotonically as the phase difference φ increases, independently of the duty ratio D. The duty ratio D and the phase difference φ are control parameters designed to vary within a range sandwiched between predetermined upper and lower limit values.

The equivalent inductance L can be defined in a simple equivalent circuit of the transformer 400 to which the secondary side magnetic coupling reactor 304 and/or the primary side magnetic coupling reactor 204 are connected to. The equivalent inductance L is a combined inductance obtained by combining the leakage inductance of the secondary side magnetic coupling reactor and the leakage inductance of the transformer 400 and/or the leakage inductance of the primary side magnetic coupling reactor 204 on the simple equivalent circuit.

For example, the equivalent inductance L which is measured from the secondary side conversion circuit 30 (secondary side conversion value $L_{EQ2}$) may be expressed as $$L_{EQ2}=2L_1(1-k_1)N^2+2L_2(1-k_2)+L_{T2}(1-k_T^2)$$ Equation 2

$L_1$ is a self-inductance of the primary side magnetic coupling reactor 204, $k_1$ is the coupling coefficient of the primary side magnetic coupling reactor 204, N is the winding ratio of the transformer 400, $L_2$ is a self-inductance of the secondary side magnetic coupling reactor 304, $k_2$ is the coupling coefficient of the secondary side magnetic coupling reactor 304, $L_{T2}$ is the excitation inductance of the secondary side of the transformer 400, and $k_T$ is the coupling coefficient of the transformer 400. Note that if the second input/output port 60c or the fourth input/output port 60d is not used, there may be no leakage inductance as indicated in term 1 or 2 in Equation 2.

Incidentally, in the power supply apparatus 101, the coupling coefficients $k_1$, $k_2$, $k_T$ or the self-inductances may have a great deviation as the dimension tolerance of the winding or the core of the transformer 400 or the magnetic coupling reactors 204, 304 is relatively large. In particular, after a coil component is assembled, the deviations of the coupling coefficients $k_1$, $k_2$, $k_T$ or the self-inductances may be significant in accordance with stress or deformation. As a result, the deviation of the equivalent inductance L also increases, and a deviation also occurs in the transmitted power P.

As can be seen from Equation 1, the transmitted power P is dependent on the equivalent inductance L and the phase difference φ. For example, the larger the value of the equivalent inductance L is, the smaller is the transmitted power P, and the smaller the value of the equivalent inductance L is, the larger is the transmitted power P. Therefore, by adjusting appropriately the phase difference φ, the equivalent inductance L or the like which serves as one of the control parameters, the transmitted power P may be controlled.

Therefore, the control unit 50 adjusts the equivalent inductance L and the phase difference φ by measuring accurately the slope of current and the delay time (details will be described later). The transmitted power P is corrected to an optimized value on basis of these measured values, thereby to suppress a variation of the transmitted power P. That is, the power supply apparatus 101 adjusts the equivalent inductance L and the phase difference φ to desired values by means of the control unit 50 and accordingly corrects the transmitted power P. Therefore, a power transmission can be performed with high accuracy.

Moreover, the control unit 50 changes the phase difference φ such that a port voltage Vp of at least one predetermined port of the primary side ports and the secondary side ports converge to a target port voltage Vo, thereby to adjust the transmitted power P. Therefore, even if the current consumed by a load connected to the predetermined port increases, the control unit 50 can adjust the transmitted power P by changing the phase difference φ, thereby to prevent the port voltage Vp from decreasing with respect to the target port voltage Vo.

For example, the control unit 50 changes the phase difference φ such that a port voltage Vp of one port that is the transmission destination of the transmitted power P of the primary side ports and the secondary side ports converges to a target port voltage Vo, thereby to adjust the transmitted power P. Therefore, even if the current consumed by a load connected to the port that is the transmission destination of the transmitted power P increases, the control unit 50 may adjust the transmitted power P in an increase direction by changing the phase difference φ to increase, thereby to prevent the port voltage Vp from decreasing with respect to the target port voltage Vo.

<Power Correction Method of Power Supply Apparatus 101>

An example of a power correction method of the power supply apparatus 101 will be described using FIG. 4. According to the power correction method, the equivalent inductance and the phase difference (control parameters) are adjusted appropriately on basis of the measured value of the slope of current and the measured value of the delay time, and the transmitted power is corrected appropriately on basis of the control parameters.

Figure 4:
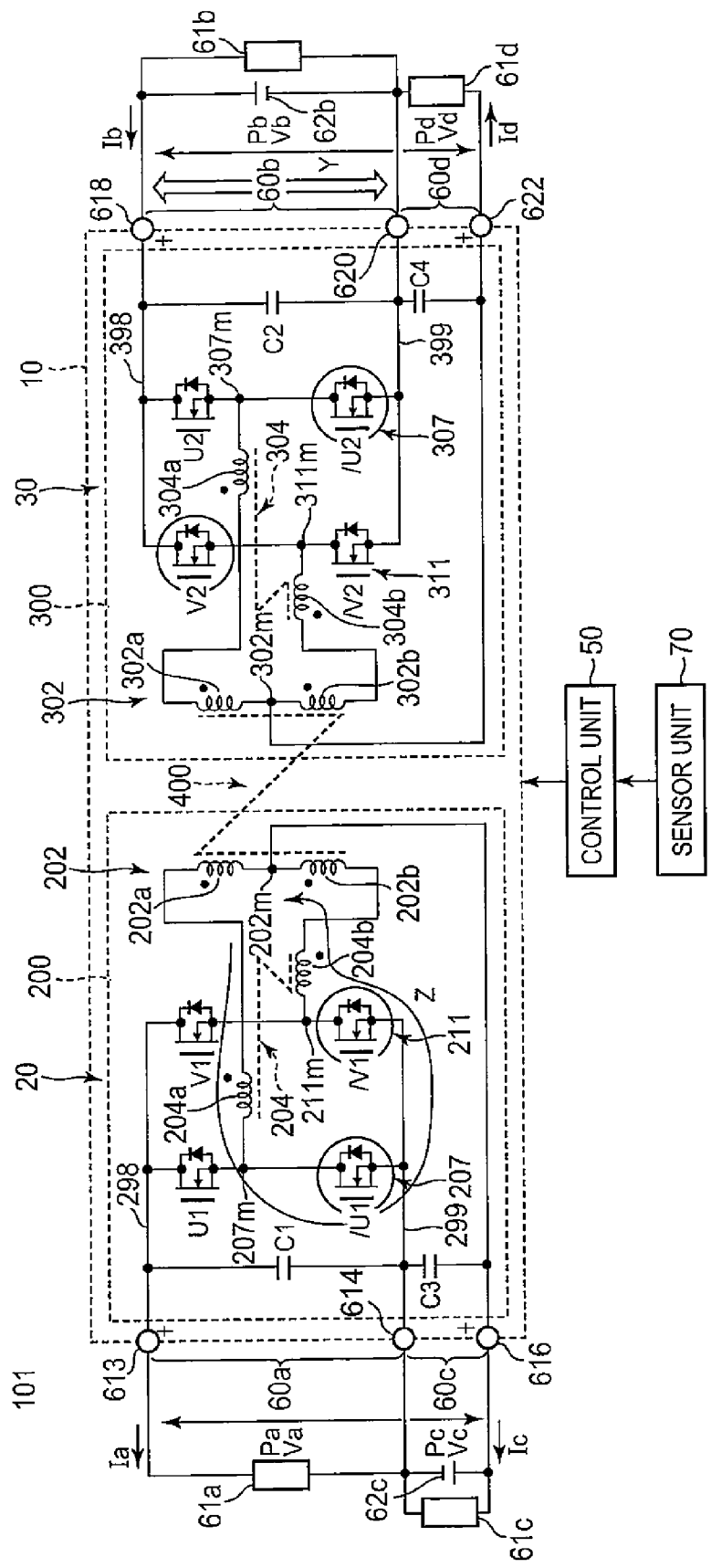
FIG. 4 is a diagram showing an example of a power correction method.

Firstly, in the primary side full bridge circuit 200, the primary side first lower arm /U1 which is electrically connected between the primary side negative electrode bus line 299 and the primary side first reactor 204a and the primary side second lower arm /V1 which is electrically connected between the primary, side negative electrode bus line 299 and the primary side second reactor 204b are turned on (see circles shown in FIG. 4).

Then, in the secondary side full bridge circuit 300, a predetermined voltage is applied between the high potential side terminal 618 of the third input/output port 60b and the low potential side terminal 620 of the third input/output port 60b and the fourth input/output port 60d (see arrow Y shown in FIG. 4).

Then, in the secondary side full bridge circuit 300, the secondary side second upper arm V2 which is electrically connected between the secondary side positive electrode bus line 398 and the secondary side second reactor 304b and the secondary side first lower arm /U2 which is electrically connected between the secondary side negative electrode bus line 399 and the secondary side first reactor 304a are turned on (see circles shown in FIG. 4). In this case, an ON signal output from the control unit 50 (for example, a PWM signal) is input to the secondary side second upper arm V2 and the secondary side first lower arm /U2.

Then, in the secondary side full bridge circuit 300, delay time α since turning on the secondary side second upper arm V2 and the secondary side first lower arm /U2 (time tα1) until current starts actually flowing in the primary side first lower arm /U1 and the primary side second lower arm /V1 in the primary side full bridge circuit 200 (time tα2) is measured. The delay time α is a difference between time tα1 and time tα2 (=time tα2−time tα1), i.e., a time difference between switching occurring in the primary side full bridge circuit 200 and the secondary side full bridge circuit 300 (between the bridge circuits). In addition, in order to accurately measure the delay time α, the primary side first lower arm /U1 and the primary side second lower arm /V1 are turned on in advance preferably.

The phase difference φ is dependent on the delay time α. The phase difference φ may be controlled by adjusting switching timing of the switching elements included in the primary side conversion circuit 20 and the switching elements included in the secondary side conversion circuit 30. Thus, the phase difference φ may be controlled with high accuracy by adjusting the switching timing according to the delay time α.

For example, time since turning on the secondary side second upper arm V2 and the secondary side first lower arm /U2 until current starts actually flowing in the primary side first lower arm /U1 and the primary side second lower arm /V1 is defined as delay time α1. In addition, time since turning on the primary side second upper arm V1 and the primary side first lower arm /U1 until current starts actually flowing in the secondary side first lower arm /U2 and the secondary side second lower arm /V2 is defined as delay time α2.

In this case, using α1, t5, α2, t6 (see FIG. 3), the phase difference φ is expressed as $$\phi=(t6+\alpha 2)-(t5+\alpha 1)=(t6-t5)+(\alpha 2-\alpha 1) \quad \text{Equation 3}$$

Therefore, the phase difference φ can be controlled with high accuracy by adjusting ON timing of the primary side second upper arm V1 and the secondary side second upper arm V2 such that (α2−α1) becomes zero.

Alternatively, time since turning on the secondary side first upper arm U2 and the secondary side second lower arm /V2 until current starts actually flowing in the primary side first lower arm /U1 and the primary side second lower arm /V1 is defined as delay time α3. In addition, time since turning on the primary side first upper arm U1 and the primary side second lower arm /V1 until current starts actually flowing in the secondary side second lower arm /V2 and the secondary side first lower arm /U2 is defined as delay time α4.

In this case, using α3, t1, α4, t2 (see FIG. 3), the phase difference φ is expressed as $$\phi=(t2+\alpha 4)-(t1+\alpha 3)=(t2-t1)+(\alpha 4-\alpha 3) \quad \text{Equation 4}$$

Therefore, the phase difference φ can be controlled with high accuracy by adjusting ON timing of the primary side first upper arm U1 and the secondary side first upper arm U2 such that (α4−α3) becomes zero.

Figure 5:
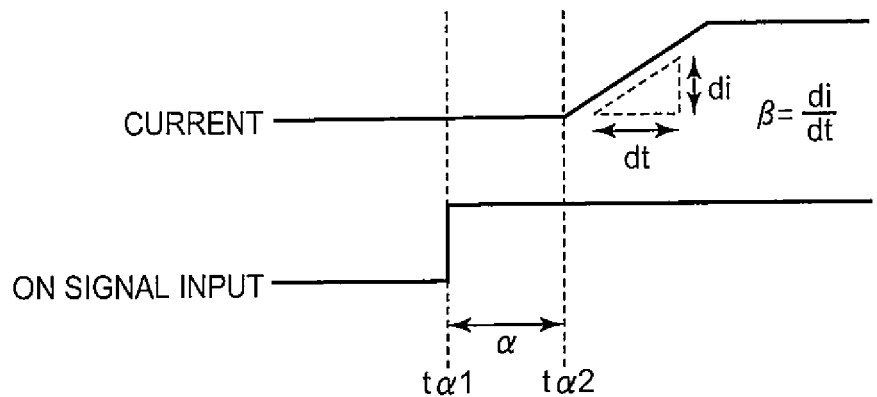
FIG. 5 is a diagram showing an example of a power correction method.

Then, in the primary full bridge circuit 200, a slope β of current increasing after it starts actually flowing in the primary side first lower arm /U1 and the primary side second lower arm /V1 in the direction of arrow Z shown in FIG. 4 since turning on the secondary side second upper arm V2 and the secondary side first lower arm /U2 is measured (see FIG. 5). The slope β of the current is expressed as variation of the current/variation of time (=di/dt).

In this case, the slope β of current and delay time α are measured in an state that the transformer 400, the primary side magnetic coupling reactor 204 (including the primary side first reactor 204a and the primary side second reactor 204b), and the secondary side magnetic coupling reactor 304 (including the secondary side first reactor 304a and the secondary side second reactor 304b) have been assembled.

The timing of turning on the switching elements is not particularly limited. For example, in the secondary side full bridge circuit 300, the secondary side second upper arm V2 which is electrically connected between the secondary side positive electrode bus line 398 and the secondary side second reactor 304b and the secondary side first lower arm /U2 which is electrically connected between the secondary side negative electrode bus line 399 and the secondary side first reactor 304a are turned on. Then a predetermined voltage is applied to the terminals of the third input/output port 60b. Then, in the primary-side full-bridge circuit 200, the primary side first lower arm /U1 which is electrically connected between the primary side negative electrode bus line 299 and the primary side first reactor 204a and the primary side second lower arm /V1 which is electrically connected between the primary side negative electrode bus line 299 and the primary side second reactor 204b are turned on. Then, in the primary-side full-bridge circuit 200, delay time until current starts flowing in the primary side first lower arm /U1 and the primary side second lower arm /V1 and slope of the current flowing in the primary side first lower arm /U1 and the primary side second lower arm /V1 are measured. Thus, the measurement may be performed in an opposite order to the above. In any case, it is sufficient to accurately measure time difference between switching occurring in the bridge circuits and slope of current flowing in one of the bridge circuits.

In the case as described above, the slope β of current to be measured is not particularly limited. For example, a slope of current after it starts actually flowing in the secondary side first lower arm /U2 and the secondary side second lower arm /V2 since turning on the primary side second upper arm V1 and the primary side first lower arm /U1 may also be measured. Alternatively, for example, a slope of current after it starts actually flowing in the primary side first lower arm /U1 and the primary side second lower arm /V1 since turning on the secondary side first upper arm U2 and the secondary side second lower arm /V2 may also be measured. Alternatively, for example, a slope of current after it starts actually flowing in the secondary side second lower arm /V2 and the secondary side first lower arm /U2 since turning on the primary side first upper arm U1 and the primary side second lower arm /V1 may also be measured.

Then, the equivalent inductance L is calculated based on the measured slope β of current. Using a predetermined voltage (in the secondary side full bridge circuit 300, a voltage applied between the high potential side terminal 618 of the third input/output port 60b and the low potential side terminal 620 of the third input/output port 60b and the fourth input/output port 60d) V and the slope β of current, the equivalent inductance L may be expressed as $$L=V/(di/dt)=V/\beta \quad \text{Equation 5}$$

As is apparent from Equation 5, the equivalent inductance L can be calculated only from the slope β of current and the predetermined voltage V. That is, the equivalent inductance L can be calculated in a relatively simple way without measuring the self-inductances and the coupling coefficients $k_1$, $k_2$, $k_T$ of the respective magnetic elements, the deviations of which varies greatly after assembling the coil components. The transmitted power is corrected by substituting the calculated value of the equivalent inductance L into Equation 1.

That is, the transmitted polder is corrected according to the measured value of the slope β of and the measured value of the delay time α. In particular, the transmitted power is corrected according to the phase difference φ and the equivalent inductance L adjusted based on the above measured values.

According to the power correction method described above, in a finished product state after assembling the coil components, the transmitted power may be corrected in consideration of any adverse effect caused by stress, deformation, contact resistance, parasitic inductance, and so on the transmitted power. Therefore, it is possible to perform power transmission with high accuracy. In addition, the transmitted power may be easily controlled as control parameters can be adjusted by utilizing the measured values in the same bridge circuit. That is, with the power correction method described above, a control technique for transmitting power among a plurality of ports of a power supply circuit may be established, which is not existent in the prior art.

The power correction method may be performed by an inspection apparatus in an inspection process in an manufacturing process of the power supply apparatus 101. After the power supply apparatus 101 is transported from a factory or the like, the power correction method may also be performed through an abnormality detection tool or the control unit 50 while the power supply apparatus 101 is in use. Place where the power correction method is performed, its use and the like are not particularly limited.

An embodiment of the power conversion apparatus and power correction method was described above, but the invention is not limited to the above embodiment, and various amendments and improvements, such as combining or replacing the above embodiment either partially or wholly with another embodiment, may be implemented within the scope of the invention.

For example, in the above embodiment, a MOSFET, which is a semiconductor element subjected to an ON/OFF operation, was cited as an example of the switching element. However, the switching element may be a voltage control type power element using an insulating gate such as an insulated gate bipolar transistor (IGBT) or a MOSFET, or a bipolar transistor, for example.

Further, a power supply may be connected to the first input/output port 60a, and a power supply may be connected to the fourth input/output port 60d. Furthermore, a power supply need not be connected to the second input/output port 60c, and a power supply need not be connected to the third input/output port 60b.

Further, in FIG. 1, although the primary side low voltage system power supply 62c is connected to the second input/output port 60c, the power supply may be connected to neither the first input/output port 60a nor the second input/output port 60c.

Further, the present invention is suitable for a power conversion apparatus that has a plurality of, at least three or more, input/output ports and is capable of converting power between any two input/output ports of the plurality of, at least three or more, input/output ports. For example, the present invention is also suitable for the power supply apparatus configured to not include any one input/output port of the four input/output ports as illustrated in FIG. 1.

What is claimed is:

1. A power correction method of correcting transmitted power, which is transmitted between a primary side circuit and a secondary side circuit which is connected to the primary side circuit via a reactor and magnetically coupled with the primary side circuit via a transformer, and is adjusted in accordance with a phase difference between switching of the primary side circuit and switching of the secondary side circuit, comprising:
    switching by turning on a first transistor and a second transistor which are connected to a negative electrode bus line of the primary side circuit;
    applying a predetermined voltage between a positive electrode bus line and a negative electrode bus line of the secondary side circuit;
    switching by turning on a third transistor which is connected to the positive electrode bus line of the secondary side circuit and a fourth transistor which is connected to the third transistor via the reactor and is connected to the negative electrode bus line of the secondary side circuit;
    measuring delay time since turning on the third transistor and the fourth transistor until current starts flowing in the first transistor and the second transistor;
    measuring a slope of the current flowing in the first transistor and the second transistor; and
    correcting the transmitted power in accordance with a measured value of the slope and a measured value of the delay time.

2. The power correction method according to claim 1, further comprising:
    calculating an equivalent inductance relating to power transmission of the transformer and the reactor on the basis of the measured value of the slope and the predetermined voltage, wherein
    the transmitted power is corrected on basis of a calculated value of the equivalent inductance when the transmitted power is corrected in accordance with the measured value of the slope and the measured value of the delay time.

3. The power correction method according to claim 1, wherein
    a timing of turning on the third transistor and the fourth transistor is adjusted on basis of the measured value of the delay time.

4. A power conversion apparatus comprising a primary side circuit, a secondary side circuit which is connected to the primary side circuit via a reactor and magnetically coupled with the primary side circuit via a transformer, and a control unit which controls transmitted power transmitted between the primary side circuit and the secondary side circuit by correcting a phase difference between switching of the primary side circuit and switching of the secondary side circuit, wherein,
    the control unit is configured to:
    turn on a first transistor and a second transistor which are connected to a negative electrode bus line of the primary side circuit;
    apply a predetermined voltage between a positive electrode bus line and a negative electrode bus line of the secondary side circuit;
    turn on a third transistor which is connected to the positive electrode bus line of the secondary side circuit and a fourth transistor which is connected to the third transistor via the reactor and is connected to the negative electrode bus line of the secondary side circuit;
    measure delay time since turning on the third transistor and the fourth transistor until current starts flowing in the first transistor and the second transistor;
    measure a slope of the current flowing in the first transistor and the second transistor; and
    correct the transmitted power in accordance with a measured value of the slope and a measured value of the delay time.

5. The power conversion apparatus according to claim 4, wherein
    the control unit is configured to:
    calculate an equivalent inductance relating to power transmission of the transformer and the reactor on the basis of the measured value of the slope and the predetermined voltage; and
    correct the transmitted power on basis of a calculated value of the equivalent inductance.

6. The power conversion apparatus according to claim 4, wherein
    a timing of turning on the third transistor and the fourth transistor is adjusted on basis of the measured value of the delay time.

* * * * *